Aug. 20, 1968        G. A. MARSH        3,398,065

METHOD AND APPARATUS FOR MEASURING CORROSION RATE

Filed Nov. 8, 1963        7 Sheets-Sheet 1

INVENTOR.
GLENN A. MARSH
BY
Edward H. Lang
ATTORNEY.

INVENTOR.
GLENN A. MARSH

Aug. 20, 1968 G. A. MARSH 3,398,065
METHOD AND APPARATUS FOR MEASURING CORROSION RATE
Filed Nov. 8, 1963 7 Sheets-Sheet 4

INVENTOR.
GLENN A. MARSH
BY
Edward H. Lang
ATTORNEY.

Aug. 20, 1968            G. A. MARSH            3,398,065

METHOD AND APPARATUS FOR MEASURING CORROSION RATE

Filed Nov. 8, 1963            7 Sheets-Sheet 6

INVENTOR.
GLENN A. MARSH
BY Edward H. Lang
ATTORNEY.

Aug. 20, 1968          G. A. MARSH          3,398,065

METHOD AND APPARATUS FOR MEASURING CORROSION RATE

Filed Nov. 8, 1963          7 Sheets-Sheet 7

INVENTOR.
GLENN A. MARSH

BY *Edward H. Lang*

ATTORNEY.

3,398,065
METHOD AND APPARATUS FOR MEASURING CORROSION RATE
Glenn A. Marsh, Crystal Lake, Ill., assignor, by mesne assignments, to Union Oil Company of California, Los Angeles, Calif., a corporation of California
Continuation-in-part of application Ser. No. 248,451, Dec. 31, 1962. This application Nov. 8, 1963, Ser. No. 322,281
23 Claims. (Cl. 204—1)

---

ABSTRACT OF THE DISCLOSURE

Method for measuring instantaneous corrosion rate comprising applying a measured potential of less than 0.03 volt across a test specimen and another electrode, and measuring the current flow between the electrodes during the time the potential is applied. The invention also includes apparatus and electric circuit for carrying out the aforementioned method.

---

Figure 1:
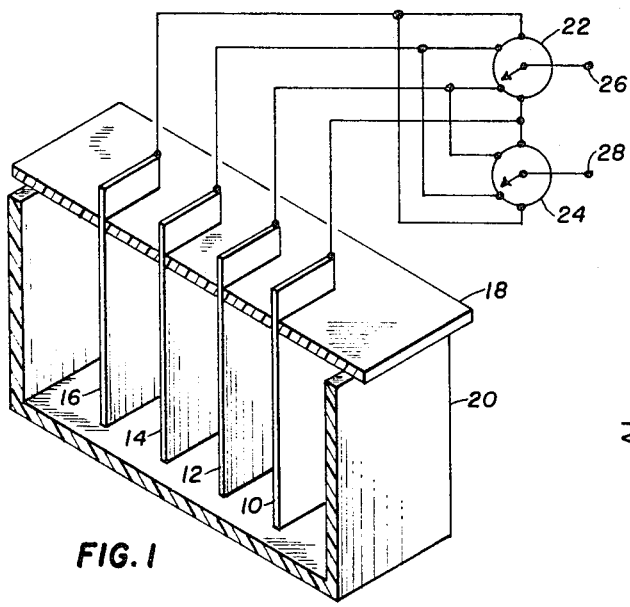

This invention relates to a method and apparatus for determining the instantaneous corrosion rate of metallic specimens exposed to a corrosive environment.

This application is a continuation-in-part of application Ser. No. 248,451, filed Dec. 31, 1962, now abandoned.

Instantaneous corrosion rates can be obtained by measuring the change of electrode potential in comparison with a reference half cell upon application of a small current from an external source, using an auxiliary electrode. The current is a direct current which is applied first in one direction and the other, alternately making the metal electrode positive and negative, and the sum of the currents is called $\Delta I$. The sum of the changes of electrode potential from the freely corroding states is called $\Delta E$. In the case of both current and potential, the absolute values of the changes $\Delta I$ and $\Delta E$ are added. The electrode under study is immersed in corrosive environment while the current-potential measurements are being made; the expression $\Delta I/\Delta E$ is shown by theory to be proportional to the corrosion rate of the metallic electrode when no current is applied, provided $\Delta E$ is not over about 0.02 volt.

Unfortunately, it is difficult to accurately determine corrosion rate by this method since reliable measurements of electrode potentials are difficult to make. The potential measurement often drifts with time. Hence, the $\Delta I/\Delta E$ method, while being of considerable academic interest, is difficult to apply in practice. When one sets about to make $\Delta I/\Delta E$ measurements, it is important to establish the base about which the measurements are made, i.e., the electrode potential in the absence of any applied current. When small changes in potential are to be measured, in the order of millivolts, drifting of the electrode potential may render the subsequent readings meaningless.

In accordance with this invention, the corrosion rate of a metal in a corrosive, electrically conductive environment is determined by disposing in the corrosive environment a plurality of spaced electrodes fabricated of the metal of which the corrosion rate is to be determined, applying between a pair of the electrodes a D.C. potential having a known value of less than about 0.03, and substantially measuring the current flow which takes place between the pair of electrodes during the time the potential is applied. The D.C. potential which is applied between the pair of electrodes is preferably about 0.02 volt since non-linearity of the function $\Delta I/\Delta E$ with corrosion rate may result if the applied potential is too high. A D.C. potential of opposite polarity and having a known value of less than about 0.03 volt is then applied between the pair of electrodes and the current flow which takes place between the pair of electrodes during the time the second potential is applied is substantially measured. Finally, the corrosion rate of the metal is determined from the magnitudes of the potentials and measured currents. The apparatus of this invention consists of electrical circuits for carrying out the above-described method.

It is a primary object of this invention to provide a novel method and apparatus for the measurement of instantaneous corrosion rates. Another object of this invention is to provide a method and apparatus by which $\Delta E$ and $\Delta I$ measurements may be made conveniently and with a high degree of accuracy and reliability.

Figure 4:
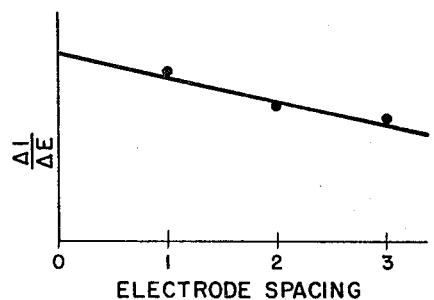
Figure 2:
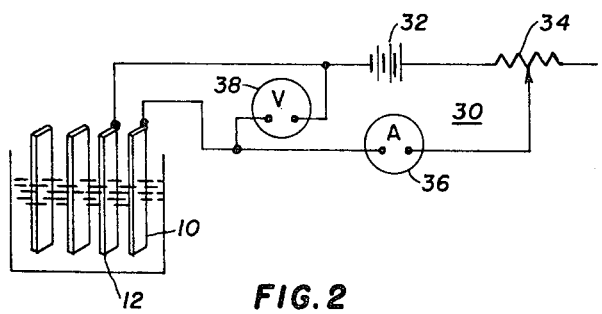
Figure 5:
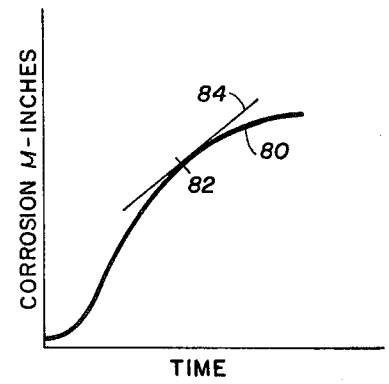
Figure 3:
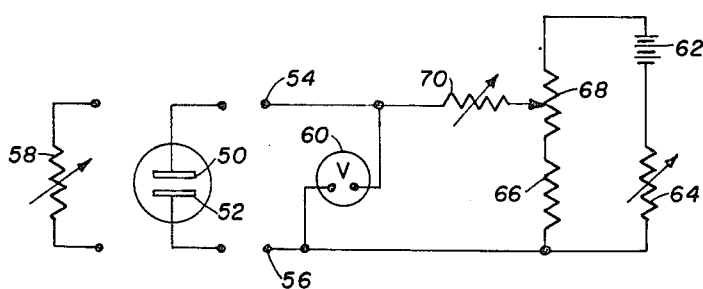
Figure 6:
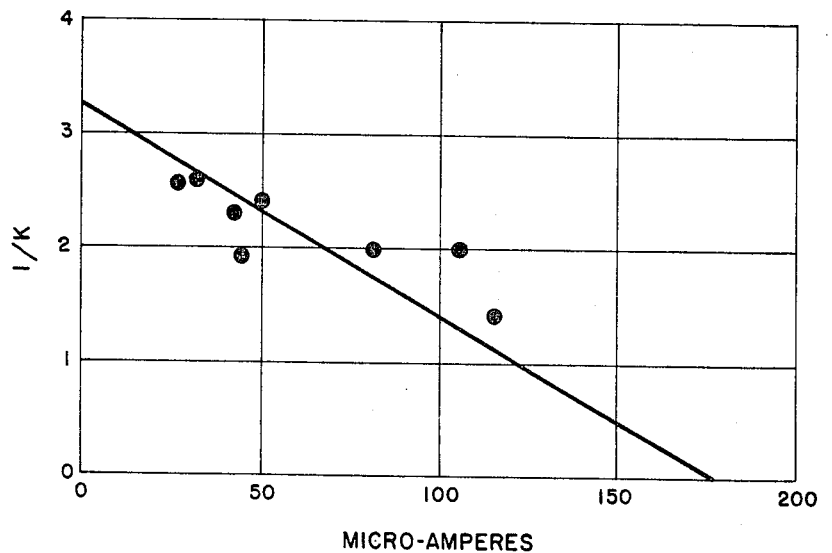
Figure 7:
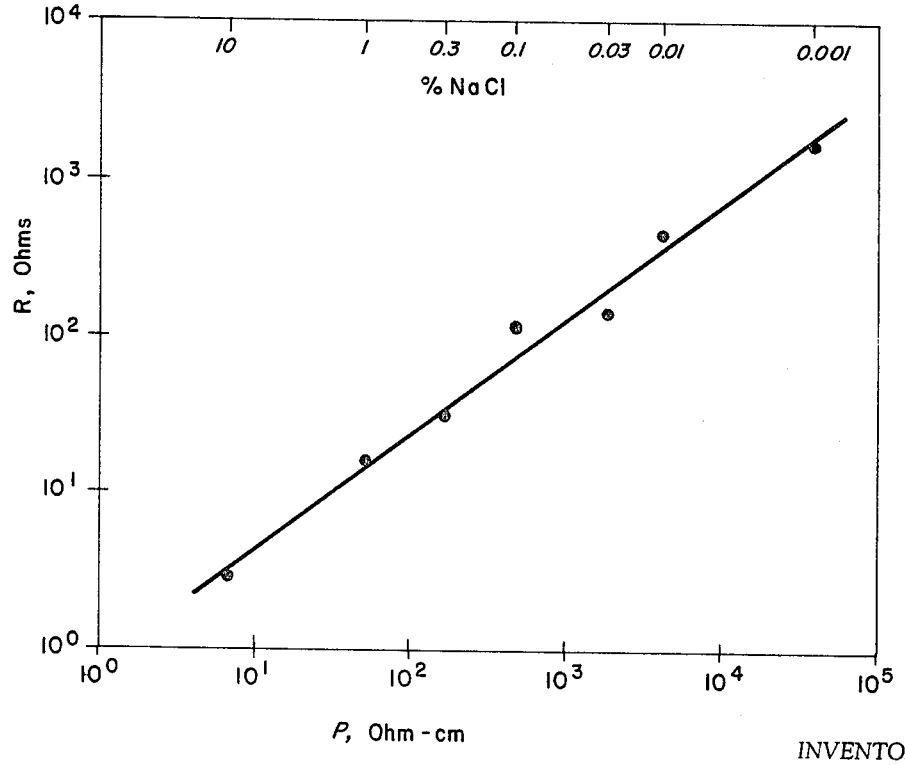
Figure 8:
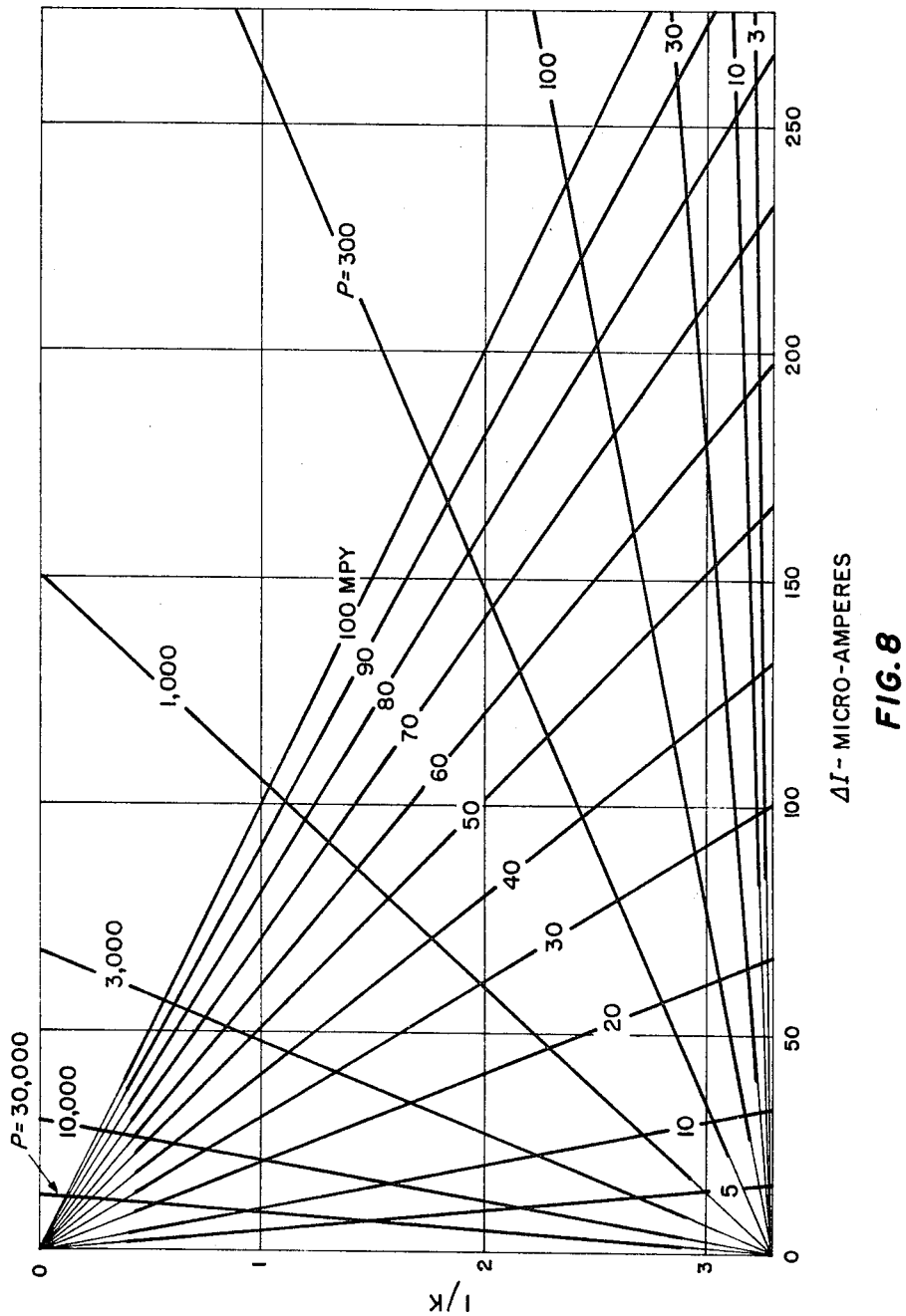
Figure 9:
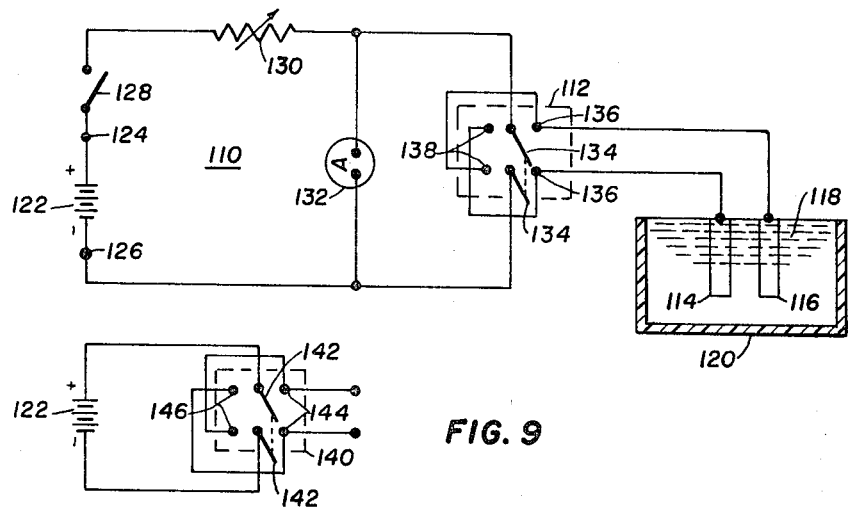

The invention will be explained with reference to the drawings, of which:

FIGURE 1 is a perspective view of a corrosion cell and switching arrangement useful in the method of this invention, FIGURE 2 shows an electrical circuit useful in carrying out the invention, FIGURE 3 is a schematic view of an alternate electrical circuit, FIGURE 4 is a graph showing the relation between $\Delta I/\Delta E$ and electrode spacing, FIGURE 5 is a graph showing the relation between corrosion and time, FIGURE 6 is a plot of K factor and $\Delta I$, FIGURE 7 is a graph used in preparing the calibration chart of FIGURE 8, FIGURE 8 is a calibration chart showing the relation between corrosion rate, K factor, $\Delta I$, and electrolyte resistivity, FIGURE 9 is a schematic view of another alternate electrical circuit.

Figure 10:
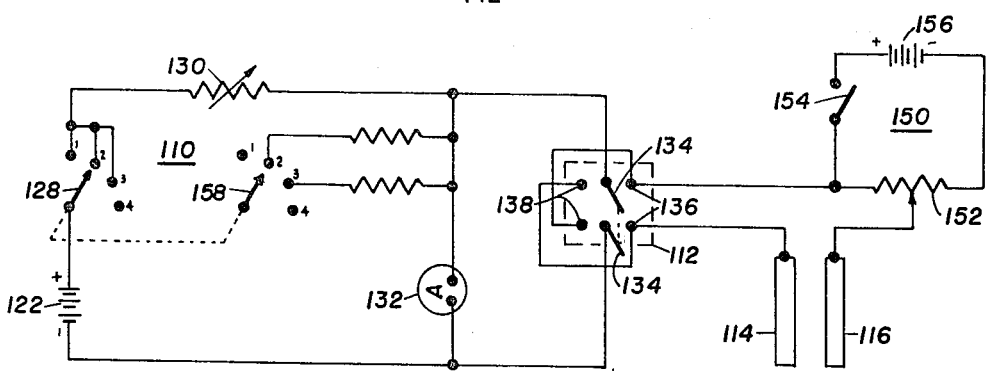
Figure 11:
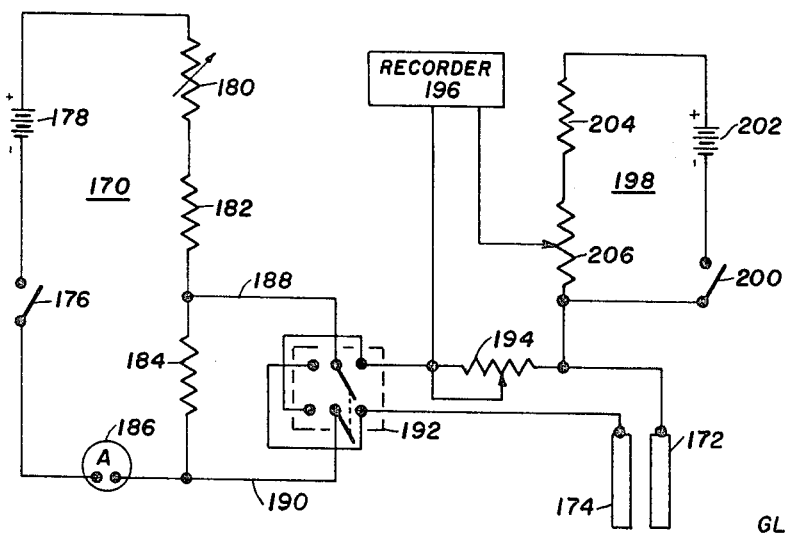
Figure 12:
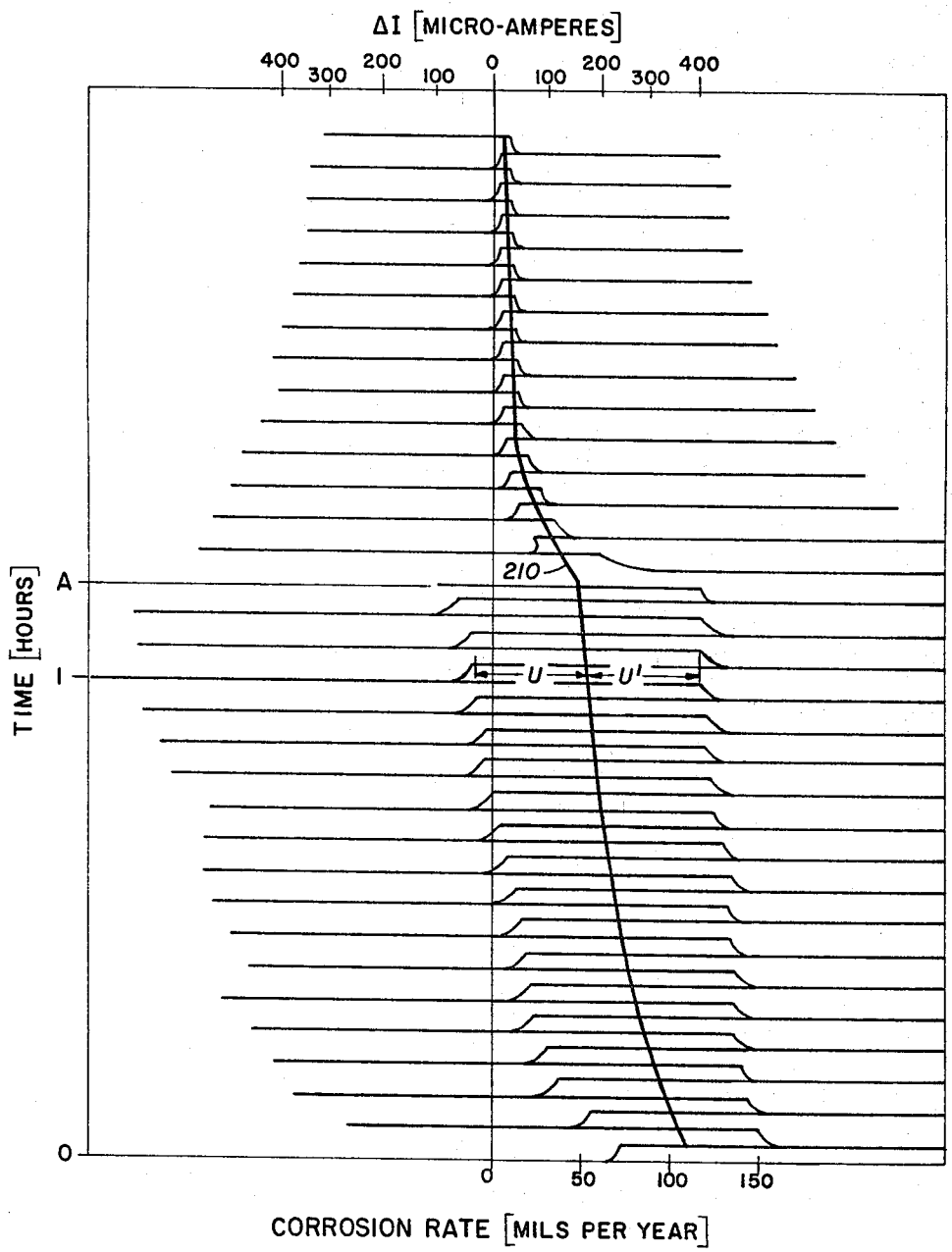
Figure 17:
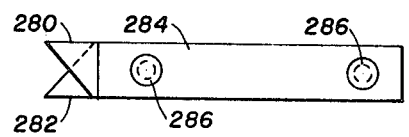
Figure 18:
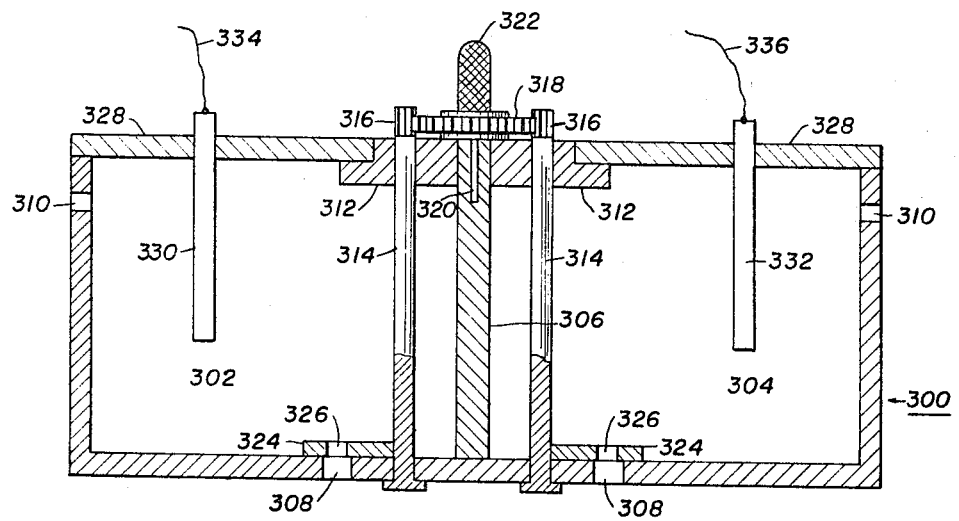
Figure 19:
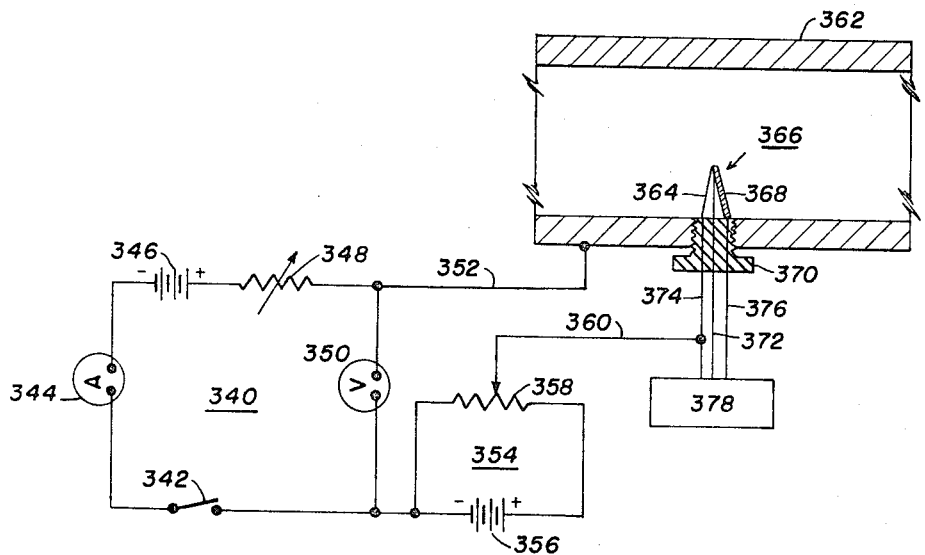

FIGURE 10 is a schematic view of an alternative embodiment of the circuit of FIGURE 9, FIGURE 11 is a schematic view of still another alternate electrical circuit which includes a recorder, FIGURE 12 is an example of the data obtained by the recorder of FIGURE 11, FIGURES 13 to 18 illustrate various types of electrode assemblies which can be used in the apparatus and method of this invention, and FIGURE 19 is a schematic diagram of still another alternate electrical circuit.

The "polarization resistance" method was utilized in the development of this invention. It was reported (E. J. Simmons, Corrosion 11, 255t (1955), and R. V. Skold and T. E. Larson, Corrosion 13, 39t (1957)), that when a small current was passed through a coupon immersed in a corrodent and the change in electrode potential $\Delta E$ upon passage of external current $\Delta I$ was noted, the ratio $\Delta E/\Delta I$, designated as the "polarization resistance," was apparently inversely proportional to the instantaneous corrosion rate of the coupon. It was later shown (M. Stern, Corrosion 14, 440t (1958)), that there is a theoretical basis for the above empirical relationship. Assuming that the polarization curves for the local anodes and cathodes are logarithmic, i.e., change of potential is linear with a change of log of current, $$\frac{\Delta E}{\Delta I} = \frac{B_a B_c}{(2.3)(I_{corr.})(B_a + B_c)} \tag{1}$$

where $B_a$ and $B_c$ are the slopes of the local anodic and cathodic polarization curves, respectively, and $I_{corr.}$ is the corrosion current.

Equation 1 applies to the region where $\Delta I$ is very small, and where the corrosion rate is controlled by activation polarization. In the situation where diffusion of dissolved oxygen controls the corrosion rate, $B_c$ is practically infinite, since an increase in applied potential in the cathodic direction cannot result in an increase in local cathodic current density. For such a case, Equation 1 becomes $$\frac{\Delta E}{\Delta I} = \frac{B_a}{(2.3)(I_{corr.})} \quad (2)$$

For various metals and alloys, $B_a$ has values from 0.07 to 0.15 volt.

Apparently, any metal or alloy may be used in the "polarization resistance" method. Even if Equation 1 does not hold strictly for the metal in question, i.e., if the polarization is not a logarithmic function of current or if the values of $B_a$ and $B_c$ change during the course of an experiment, there will still be a qualitative relationship in which a higher $\Delta I$ is equivalent to a higher corrosion rate. This is inherent in the concept of electrochemical polarization.

The principal objections to the "polarization resistance" method of obtaining corrosion rates are the needs for precise electrode potential data and a reference electrode. Both of these objections are overcome by utilizing two electrodes of the same metal or alloy in the "dual electrode" method.

In the "dual electrode" method two substantially identical electrodes are used, and the instantaneous corrosion rate is approximated by measuring the current needed to effect a difference of less than about 0.03 volt in the potential of the electrodes. It will be noted that the potential is measured between the two electrodes rather than with reference to a reference electrode. Current passing between the electrodes depresses the potential of one of them and elevates the potential of the other from the freely corroding potential. An averaging system is desirable since the electrode potentials of two substantially identical pieces of metal may be quite a few millivolts apart when the electrodes are immersed in the same electrolyte. Current is first passed through the electrodes in one direction and the $\Delta I$ required to move the potentials less than about 0.03 volt apart is noted. Then the current is reversed and the new $\Delta I$ is noted. U.S. Patent 3,069,332 discloses a somewhat similar method.

In order to accurately convert current to common units of corrosion rate, a calibration is needed in which the corrosion rates are measured by another means at the same time as $\Delta I$ measurements are being made. In addition, a correction must be made for an IR drop which arises proportional to the current flowing between the electrodes. The measured potential difference, which is preferably about 0.02 volt, is equal to the sum of the desired polarization changes at the anodic and cathodic surfaces, plus unwanted IR drops at these surfaces and through the electrolyte.

The calibration is based on Equations 1 and 2, which for the dual electrode modification is $$I_{corr.} = \frac{2B \Delta I}{2.3 \Delta E} \quad (3)$$

where B is a constant, such as $B_a B_c / B_a + B_c$. It is convenient to hold $\Delta E$ constant. The quantity $\Delta I$ is a current density which itself is a measure of relative corrosion rate, but if desired it can be converted to common units of corrosion rate by appropriate conversion factors. A convenient conversion for steel is $2.2 \times 10^{-6}$ amperes/cm.²/mil per year corrosion rate. Equation 3 uncorrected for solution resistivity then becomes:

$$U = \frac{2B \Delta I}{2.3 (\Delta V)(2.2 \text{ ma./cm.}^2) A} \quad (4)$$

where U is corrosion rate in mils per year, $\Delta I$ is the measured current in microamperes, $\Delta V$ is the applied voltage in volts, and A is the electrode area in cm.².

Equation 4 for determining the corrosion rate may be simplified as $$U = K' \frac{\Delta I}{\Delta E} \quad (5)$$

where $K'$ is a constant "calibration factor" for a specific system since it includes the value of B of the metal from which the electrodes are fabricated and the electrode area. However, since $\Delta E$ is preferably held constant at 0.02 volt, $K'$ can also include the value of 0.02 volt for $\Delta E$ to further simplify Equation 4 to $$U = K \Delta I \quad (6)$$

Referring to FIGURE 1, electrodes 10, 12, 14 and 16, all of which are fabricated of identical metal, are supported by electrically insulating cover 18 and extend downward into vessel 20, which is adapted to contain a corrosive environment. Each electrode is connected to a terminal of switch 22 and a terminal of switch 24, so that by appropriate action of the switches, terminals 26 and 28 may be connected across any selected pair of the electrodes. Referring to FIGURE 2, an electrical circuit designated 30 is shown connected across the electrodes arbitrarily selected to be electrodes 10 and 12 of the cell of FIGURE 1. Circuit 30 consists of a potential source 32, a variable resistor 34, an ammeter 36, and voltmeter 38. The ammeter is selected to accurately read very small currents, while the voltmeter is preferably a null type potentiometer which has infinite resistance at null, or a vacuum tube voltmeter. Electrodes 10 and 12 are essentially identical, and are fabricated of the metal to be studied. The electrodes are exposed to a corrosive environment held in an enclosing vessel.

In operation, variable resistor 34 is adjusted to give enough current to cause a desired deflection to appear on voltmeter 38. In practice, this deflection may be 0.02 volt. It should not be above 0.03 volt as non-linearity of the function $\Delta I/\Delta E$ with corrosion rate may result. The reading on ammeter 36 is obtained. Now the leads connecting to electrodes 10 and 12 are reversed, as for example, by adjusting switches 22 and 24 of FIGURE 1, so that the polarity of the potential applied to electrodes 10 and 12 is opposite. Resistor 34 is again adjusted to cause voltmeter 38 to read 0.02 volt. The current on ammeter 36 is again read. The current readings and voltage readings are then added together, disregarding sign, to give the desired values of $\Delta E$ and $\Delta I$.

Corrosion rate may then be calculated from the equation:

$$\text{Corrosion rate} = K' \frac{\Delta I}{\Delta E}$$

where $K'$ is a proportionality constant and $\Delta I$ and $\Delta E$ are as indicated. The value of the proportionality constant will, of course, depend upon whether the corrosion rate is to be expressed as a corrosion current or in some other convenient units, such as milli-inches per year.

It will be apparent that $\Delta E$ includes a potential drop at the anodic metal, a potential drop at the cathodic metal, and a potential drop due to the resistance of the electrolyte, that is, the corrosive medium. The potential drop due to the resistance in the electrolyte is undesired, and if sufficiently large, will introduce an error into the calculated corrosion rate. To minimize this error, the four electrodes shown in FIGURE 1 can be used. It will be observed that the distance between electrodes 10 and 14 is greater than the distance between electrodes 10 and 12, and the distance between electrodes 10 and 16 is yet greater. If all four electrodes are fabricated of the same metal and the spacing between them is known, it is possible to group the electrodes into three pairs of different spacing, that is, electrodes 10 and 12, electrodes 10 and 14, and electrodes 10 and 16. By proper manipulation of switches 22 and 24, measurements can be made for each electrode pair, and the $\Delta I/\Delta E$ ratio for each electrode pair determined. Where the resistivity of the electrolyte is reasonably low, the $\Delta I/\Delta E$ ratios for the electrode pairs will be the same within experimental error. For electrolytes of higher resistivity, say 10,000 ohm-cm., a difference in the $\Delta I/\Delta E$ ratios will become apparent, the ratio becoming smaller for the further separated electrode pairs. Where the resistivity of the electrolyte is very high, the difference in the ratios may become appreciable. Under such circumstances, and especially where the current ΔI is high, it is desirable to eliminate the potential drop caused by electrolyte resistance, and this can be conveniently accomplished by employing a plurality of electrode pairs of differing spacing, calculating the ΔI/ΔE ratio for each electrode spacing, and extrapolating to zero electrode spacing to determine a ΔI/ΔE ratio which would correspond to that which would be obtained if there were no potential drop caused by electrolyte resistance. In practice, this may be done mathematically by conventional techniques of analytical geometry, by determining the equation which expresses ΔI/ΔE as a function of electrode spacing, and solving the equation for zero electrode spacing, or by plotting the data on a graph and extending the curve to the zero electrode spacing axis, as illustrated in FIGURE 4.

In practice, many corrosive environments are sufficiently conductive so that a single ΔI/ΔE ratio measurement may be determined and employed to calculate the instantaneous corrosion rate. Where the environment resistivity is less than 100 ohm-cm., it can usually be neglected, a single measurement being taken. Where the conductivity of the corrosive environment is in doubt, a second measurement should be made at a different electrode spacing and the ratios compared. If the first and second measurements are substantially identical, the conductivity of the corrosive environment is sufficient to permit direct use of the data for corrosion rate determination. When it is found that there is a substantial difference in the ratios determined, sufficient additional measurements at other spacing should be taken so that a curve expressing ΔI/ΔE ratio as a function of electrode spacing can be determined and solved for zero electrode spacing.

As a specific example of the method of this invention as above described, an electrode assembly was made in accordance with FIGURE 1, except that the electrodes consisted of four mild steel rods, 3/16 of an inch in diameter, spaced on 1 inch centers parallel to each other. The exposed area of each electrode was 7.7 centimeters. The electrodes were held in rubber mounts drilled to accommodate the electrodes. The corrosive solutions were contained in open beakers. A magnetic stirrer was used in some cases to provide agitation. Referring to FIGURE 2, meter 38 was a vacuum tube voltmeter, while meter 36 was a micro-ammeter capable of reading fractional microamperes. Current source 32 was a 1.5 volt dry cell, and variable resistor 34 was fabricated of a 1 megohm resistance, a 0.1 megohm resistance, and a 5 megohm variable resistance connected in series.

To make each run, a corrosive solution was placed in a beaker and the electrode assembly was immersed in the corrosive solution. Current was applied between two of the four electrodes. The current ΔI corresponding to a potential of 0.02 volt as measured by the vacuum tube voltmeter, was measured and recorded. The connections to the two electrodes were then reversed and the new current recorded. In each case the voltage was maintained at 0.02 volt by adjustment of variable resistor 34. The run was completed when forward and reverse currents had been measured for each of the three electrode spacings. The extrapolated value of ΔI was then obtained by plotting the average ΔI for each electrode pair as a function of the electrode pair spacing and extrapolating back to zero spacing. This was done graphically. The extrapolated value was then divided by the electrode area, 7.7 square centimeters, to yield the ΔI current per square centimeter. The corrosion rate was then determined by the equation:

$$\text{Corrosion rate} = K \Delta I$$

where, K is taken as 0.2, and corrosion rate measured in mils per year. While the proper value of K varies from situation to situation, the above factor is correct for steel electrodes of 7.7 square centimeter area under the conditions of this experiment. Other values for K can be determined as hereinafter described.

Table I lists data obtained with the four electrode device of FIGURE 1 for a variety of solutions. One skilled in the art will note the instantaneous corrosion rates are in the expected order of magnitude; furthermore, in very dilute sodium chloride solutions agitation has no accelerating effect, nor is there a high rate in agitated de-aerated solutions. Agitation has a pronounced effect on a corrosion rate in aerated, conductive solutions. The corrosion rate drops off in aerated solution saturated with sodium chloride due to low solubility of oxygen in such a solution. All of these observations correlate properly with known theoretical considerations.

TABLE I.—INSTANTANEOUS CORROSION RATE APPARATUS. MILD STEEL ELECTRODES, 7.7 cm.²

| Run No. | Corrosive Solution | Electrode Spacing, inches | ΔI at a ΔE of 0.02 | | | ΔE/ΔI extrapolated to Zero Spacing, volt per amp. per cm.² | Instantaneous Corrosion Rate, mils per year, calc'd. |
|---|---|---|---|---|---|---|---|
| | | | Forward | Reverse | Average | | |
| 1 | 0.001% NaCl Static, aerated | 1 | 12.0 | 2.8 | 7.4 | 16,500 | 18.4 |
| | | 2 | 12.0 | −0.05 | 6.0 | | |
| | | 3 | 4.0 | 4.7 | 4.4 | | |
| 2 | 0.001% NaCl Agitated, aerated | 1 | 9.8 | 1.9 | 5.8 | 25,000 | 12.2 |
| | | 2 | 5.9 | 4.0 | 5.0 | | |
| | | 3 | 5.4 | 4.3 | 4.8 | | |
| 3 | 0.01% NaCl Agitated, aerated | 1 | 25.0 | 7.8 | 16.4 | 10,000 | 3.0 |
| | | 2 | 10.0 | 18.0 | 14.0 | | |
| | | 3 | 21.0 | 9.1 | 15.5 | | |
| 4 | 0.01% NaCl Static, aerated | 1 | 29.0 | 5.1 | 17.5 | 10,000 | 3.0 |
| | | 2 | 10.0 | 10.0 | 10.0 | | |
| | | 3 | 14.1 | 10.0 | 12 | | |
| 5 | 0.1% NaCl Agitated, aerated | 1 | 125 | 50 | 87 | 1,650 | 18.6 |
| | | 2 | 60 | 94 | 77 | | |
| | | 3 | 100 | 56 | 78 | | |
| 6 | 0.1% NaCl Static, aerated | 1 | 46 | 31 | 38 | 3,650 | 8.4 |
| | | 2 | 39 | 41 | 40 | | |
| | | 3 | 35 | 57 | 46 | | |

FIGURE 3 shows an alternate measuring circuit constructed in accordance with this invention. Electrodes 50 and 52 are connected to terminals 54 and 56 of the circuit to measure instantaneous corrosion rates. Alternatively, terminals 54 and 56 could be connected to terminals 26 and 28 of switches 22 and 24 of the apparatus of FIGURE 1. Resistor 58 is connected across terminals 54 and 56 of the measuring circuit to calibrate the circuit. Meter 60 is a high resistance or vacuum tube voltmeter. D.C. current source 62, variable resistor 64, fixed resistor 66, and potentiometer 68 are series connected in closed circuit. Variable resistor 70 connects between the slide of potentiometer 68 and terminal 54. Potentiometer 68 is preferably a 0 to 100 ohm helical potentiometer equipped with a linearly calibrated dial indicating the resistance in the lower leg of the potentiometer, that is, the resistance in the leg adjacent fixed resistor 66. Fixed resistor 66 will then have a value of two ohms, while the value of variable resistor 64 and potential source 62 will be adjusted such that when potentiometer 68 is set to zero, that is, the slide is connected directly to the junction between fixed resistor 66 and potentiometer 68, it is possible to adjust variable resistor 64 to provide a reading of 0.02 volt at meter 60, when no load is connected between terminals 54 and 56. Since there is no load, the position of variable resistance 70 is immaterial.

In operation, assuming it is desired to calibrate the 0 to 100 microamperes when a potential of 0.02 volt is applied to terminals 54 and 56, a known resistance 58 circuit of FIGURE 3 to read currents over the range of must be employed. To provide 100 microamperes of current at 0.02 volt, by Ohm's law, resistor 58 must have a value of 200 ohms. To calibrate the circuit, with no load connected across terminals 54 and 56, the resistor 64 is adjusted to provide a meter reading of 0.02 volt when potentiometer 68 is in the zero position, that is, with all of the resistance above the slide. Next, 200 ohm resistance 58 is connected between terminals 54 and 56, and potentiometer 68 is adjusted to the 100 ohm position. Variable resistor 70 is then adjusted to again provide a reading at meter 60 of 0.02 volt. Assuming the circuit is designed so that the current flow in the closed loop consisting of elements 62, 64, 66, and 68 is many times larger than the current flow through the load applied between terminals 54 and 56, the ohm reading on potentiometer 68 will also indicate the current, in microamperes, flowing through the load, provided only that the potentiometer is adjusted so that meter 60 reads 0.02 volt. Thus, after calibration, the circuit can be employed in the method of this invention by connecting terminal 54 to electrode 50 of the cell and terminal 56 to electrode 52 of the cell, adjusting potentiometer 68 to provide a meter reading of 0.02 volt at meter 60, and reading the current flow, in microamperes, directly from potentiometer 68. Of course, it is desirable to pass the current trough the electrodes in both directions, measuring current values in each direction, so that the corrosion rate can be calculated as before described. A simple reversing switch, not shown, permits this to be done.

It is also possible, by proper calculation of the value of calibrating resistor 58, to adjust the circuit so that potentiometer 68 will read directly in corrosion units, such as milli-inches per year. It was before stated that corrosion rate=$K\Delta I$, when $\Delta E$ is held constant. Since K is determined to provide corrosion rate in milli-inches per year for an electrode area of one centimeter, and since $\Delta I$ is the average of two currents of reversed direction, it is evident that: corrosion rate=$K_1 \Delta I_1$, and $I_1$ is the current in a given direction. Assuming it is desired to calibrate the potentiometer 68 to read corrosion rates in the range of 0 to 100 milli-inches per year, the electrode area is 5 square cm., and K is 0.3 for steel electrodes corroding in an aerated electrolyte, one can write $100=0.3\Delta I_1$, or, $\Delta I_1 = 333$ microamperes. Since for this system the current measurement in one direction equivalent to a 100 milli-inch per year corrosion rate is 333 microamperes, and since the applied potential is 0.02 volt, by Ohm's law the desired value for calibrating resistance 58 is 67 ohms. Thus, to calibrate the circuit, with no load across terminals 54 and 56, and potentiometer set to zero, variable resistor 64 is adjusted to provide a reading of 0.02 volt at meter 60. Then the 67 ohm resistance is connected between terminals 54 and 56, potentiometer 68 is adjusted to read 100, and variable resistor 70 is adjusted to again provide a reading of 0.02 volt at meter 60. The device as thus calibrated will read corrosion rates directly on the potentiometer, assuming as always the potentiometer is adjusted to provide a voltage reading of 0.02 volt.

As before, it remains desirable to reverse the polarity of the connection to the electrodes to make current readings in both directions. In this case, the corrosion rate readings obtained directly from potentiometer 68 should be averaged. As before described, where it is desired to employ a plurality of electrode pairs at different spacing to permit elimination of the electrolyte resistance, the extrapolation procedure can be carried out with the difference that the measured corrosion rates, rather than calculated $\Delta I / \Delta E$ ratios, will be plotted as a function of electrode spacing. The corrosion rate corresponding to zero electrode spacing will be read at the zero electrode spacing intercept.

Alternatively, it is possible to accurately convert current to common units of corrosion rate by utilizing a calibration chart. As hereinbefore pointed out, Equation 4 for determining corrosion rate is uncorrected for solution resistivity. When current flows between the electrodes, the measured potential difference, which is preferably constant at 0.02 volt, is equal to the sum of the desired polarization changes at the anodic and cathodic surfaces, plus unwanted IR drops at these surfaces and through the electrolyte.

If $\Delta E_c$ represents the true polarization change and the potential difference is held at 0.02 volt, then $$\Delta E_c = 0.02 - \Delta I(R) \qquad (7)$$

where R represents a function of the resistivity of the electrolyte. Equation 4 corrected for IR drop is then $$U = \frac{2B\Delta I}{(2.3)(2.2)A 0.02 - \Delta I(R)} \qquad (8)$$

Assuming that the electrode area is 5 cm.² and using a value of 0.075 for B (the best value of B for steel in neutral solutions), Equation 8 becomes $$U = \frac{0.0059 \Delta I}{0.02 - \Delta I(R)} \qquad (9)$$

The coefficient of $\Delta I$ is the "calibration factor" K, $$K = \frac{0.0059}{0.02 - \Delta I(R)} \qquad (10)$$

or, in a more convenient form, $$1/K = 3.3 \frac{R}{0.0059} \Delta I \qquad (11)$$

K can then be evaluated by obtaining the corrosion rate of twin probe electrodes, using the electrical resistance method of the prior art.

Since prior art corrosion measurement techniques, including methods such as the weighing of coupons, or the use of electrical resistance corrosion probes, measure the extent of corrosion over a given period of exposure, rather than an instantaneous corrosion rate, correlation of the results obtained by the method of this invention with the results of other corrosion measurement techniques requires something more than direct comparison. For example, an electrical resistance corrosion probe exposed to a corrosive environment for a period of ten days will indicate an extent of corrosion which, when consideration has been made for the time factor, will produce an average corrosion rate figure of, say, 20 milli-inches per year. This, however, is an average figure, and, in practice, the corrosion rate at any instant during the ten day period, such as after the elapse of 24 hours, might be something different from the average of 20 milli-inches per year. In accordance with this invention, however, a method has been devised by which correlation can be made between the instantaneous corrosion rates measured in accordance with the method of this invention, and average corrosion rates measured in accordance with methods of the prior art.

In accordance with this method, a corrosive environment is established in an apparatus such as that shown in FIGURE 1, and a prior art corrosion measuring device, preferably an electric resistance type corrosion probe such as described in U.S. Patent No. 2,987,685 to Edward Schaschl, is also exposed to the corrosive environment. At regular periodic intervals the extent of corrosion, as detected by the prior art corrosion probe, is measured and recorded, while the instantaneous corrosion rates, or more precisely, $\Delta I / \Delta E$, are measured in accordance with the method of this invention. Measurements may be made, for example, every day for a period of a week, or every hour for a period of several hours. The total corrosion measurements recorded are then plotted as a function of time to produce a curve such as curve 80 of FIGURE 5. It will be seen that the total cumulative corrosion at any instant is represented by the height of the curve above the time axis. The time rate of corrosion is, of course, proportional to the slope of the curve, and ordinarily will not be constant. However, the slope of the curve at point 82, as represented by tangent 84, has some finite value representing the instantaneous corrosion rate at that time. Thus, it is possible to compare the instantaneous corrosion rates calculated in accordance with the method of this invention with the slope of the curve produced from a number of total corrosion extent measurements made over a period of time. Again, the comparison may be made graphically or analytically. For example, by known mathematical techniques the equation corresponding to curve 80 may be determined, and differentiated with respect to time. This differential equation may then be solved for any time to determine the instantaneous corrosion rate. The equation, of course, will be solved for some time instant at which measurement of the $\Delta I/\Delta E$ ratio was made. Since corrosion rate=$K\Delta I$ at constant $\Delta E$, and since the corrosion rate can be determined graphically or from the differential equation of the corrosion-time curve, the equation can readily be solved for a value of K which will correlate the results obtained by the method of this invention with prior art corrosion measuring techniques. Preferably, the corroding elements of two prior art resistance-change corrosion probes will be used as the electrodes for the instantaneous corrosion rate measurement, during calibration tests, to insure that identical corrosion rates are measured and compared.

Using Equation 6, a tentative value of K can then be found as the proportionality constant between each measured corrosion rate and the corresponding $\Delta I$. Next, for a given resistivity of corrodent, $1/K$ is plotted against $\Delta I$ for various corrosion rates, since from Equation 11 such a plot yields a straight line having a slope of $R/0.0059$ and passing through $1/K$ at 3.3 when $\Delta I=0$. FIGURE 6 is a plot of $1/K$ vs. $\Delta I$ for an air-saturated 1% aqueous sodium chloride solution. The corrosion rate is varied by a factor of ten or more by varying the degree of agitation of the solution. Curves similar to that of FIGURE 6 were plotted from the K and $\Delta I$ data obtained with other sodium chloride solutions of different compositions, and the slopes of these curves were then obtained and used to calculate R, as shown in Table II.

The experimental R values were plotted against resistivity, as shown in FIGURE 7. Calculated values of R, which are also listed in Table II were then obtained from the smooth curve of FIGURE 7.

TABLE II.—COMPOSITION, RESISTIVITY, AND R[1] OF AERATED NaCl SOLUTIONS

| Composition, Percent NaCl | Resistivity, ohm-cm. | R Experimental, ohms | R from Figure 7, ohms |
|---|---|---|---|
| 0.001 | 40,000 | 1,900 | 1,950 |
| 0.01 | 4,400 | 470 | 395 |
| 0.03 | 2,000 | 150 | 225 |
| 0.1 | 480 | 112 | 75 |
| 0.3 | 170 | 32 | 35 |
| 1.0 | 52 | 15 | 14 |
| 10.0 | 7 | 3 | 3 |

[1] A function of resistivity.

Once R is known, a calibration curve, which can be used to convert any reading of $\Delta I$ into corrosion in terms of mpy, can then be constructed. To construct such a calibration curve, $1/K$ is plotted against $\Delta I$ for a given resistivity. The calibration curve passes through $1/K$ at 3.3 when $\Delta I$ is 0 and has a slope of $-R/0.0059$ (R being obtained from FIGURE 7).

FIGURE 8 is a calibration curve for various resistivities ($\rho$), from $\rho=3$ to $\rho=30,000$ ohm-cm. The reciprocal of K is plotted as ordinate and $\Delta I$ as abscissa. The lines of negative slope are lines of constant corrosion rate, while the lines of positive slope are lines of constant electrolyte resistivity. The tie-lines are drawn in by connecting the origin with points along the line $1/K=1$, since $\Delta I$ is numerically equal to m.p.y. along this line. The chart is applicable for steel electrodes of 5 square cm. area spaced 1 cm. apart in aqueous systems having a pH in excess of about 5, with an applied potential of 0.02 volt. It will be noted that the effect of a change of electrolyte resistivity upon measured corrosion rate is great at high resistivities and high corrosion rates, and small at low resistivities and low corrosion rates.

The electrodes used in the apparatus and method of this invention are of any electrically conductive material, e.g., metal or alloy. They may be of any convenient size and shape, and it is best that they be rigidly mounted in substantially parallel relationship. The electrodes may be mounted on pipe plugs or other fittings to permit their installation in pressure vessels, pipes, and the like, or they may be also constructed in such a way as to permit them to be driven into the soil. The exposed areas of the electrodes must be known, since this area enters into the calculation of the corrosion rate.

Surface condition of the electrodes is important. If the electrodes are highly polished, the corrosion rate obtained will apply to polished metal, but if the electrodes are rusted, the corrosion rate obtained will apply to rusted metal. Contrary to the corrosion measuring devices and methods of the prior art, i.e., electrical resistance method, two dissimilar electrodes can also be used in the apparatus and method of this invention. The electrodes can be subjected to different chemical and/or physical environmental conditions, that is, they can be of different metals, have different surface conditions (i.e., one pre-corroded and one uncorroded), be maintained at different temperatures, be under different conditions of stress, etc. The vessel or pipe containing the corrosive environment can be used as one of the electrodes if it is fabricated of an electrically conductive material.

The corrosion results obtained by using two dissimilar electrodes in the apparatus and method of this invention will usually be an average of the corrosion rates of each of the electrodes. For example, if an uncorroded electrode and a precorroded electrode are used together, the instantaneous corrosion rate obtained will be an average of the individual corrosion rates of the electrodes. Similarly, an average corrosion rate is obtained, as for example, if two steel electrodes are used, only one of which is under stress. These average corrosion measurements, which are obtained using two dissimilar electrodes, are generally relative measurements, as for determining the effectiveness of corrosion inhibitors. However, by the use of an apparatus and method to be hereinafter described, two electrodes of dissimilar metals can be used to obtain the actual corrosion rate of the electrode fabricated of the less active metal in the electromotive series.

The current readings can be made within a relatively short time (i.e., within about 20 seconds) after the potential is applied between the electrodes to obtain reproducible results. It is preferred to wait at least about five seconds after the potential is applied since there is some drift of current, the greatest part of which takes place during about the first five sceonds.. Preferably, an excess potential, e.g., about 2 to 5 times greater than $\Delta E$, is initially applied between the electrodes and the applied potential is then almost immediately reduced to $\Delta E$ to reduce the current drifting time.

Although it is preferred to apply voltages of opposite polarities between the electrodes and use the averages of the applied voltages and the current flows between the electrodes at the time the voltages are applied to determine the corrosion rate as hereinbefore described, usable results are obtained when a voltage is applied in only one direction and the current flow is noted. This is especially true when electrodes having essentially the same electrode potential are used.

An alternative embodiment of a circuit for carrying out the process of this invention utilizing only one meter is schematically illustrated in FIGURE 9. Referring to FIGURE 9, the closed circuit designed by the numeral 110 is connected through reversing switch 112 across electrodes 114 and 116, which are substantially identical electrodes of the metal to be studied disposed in electrolyte 118 contained in vessel 120. Circuit 110 consists of D.C. potential source 122 connected to terminals 124 and 126, switch 128, variable resistor 130 of relatively high magnitude, and ammeter 132. Ammeter 132 is an ammeter of relatively high resistance, as for example, within the range of about 500 to 2000 ohms, capable of accurately indicating currents of small magnitude. Reversing switch 112 is a double-pole, double-throw switch constructed so that the polarity of the potential applied to electrodes 114 and 116 can be reversed by moving contacts 134 from positions 136 to positions 138, or vice versa. The center position of switch 112 is "off," that is, no connections are made.

As a specific example of the circuit illustrated in FIGURE 9, the system under study consists of electrodes 114 and 116, which are mild steel rods each having an exposed area of 5 square centimeters, disposed in electrolyte 118, being a 1% aqueous sodium chloride solution. Potential source 122 is a plurality of series-connected dry cells having a total E.M.F. of 9 volts, and resistor 130 consists of a 0.1 megohm variable resistance, a 1 megohm variable resistance and a 15 kilohm resistance connected in series. Resistor 130 is the current limiting resistance of the circuit. Ammeter 132 completing circuit 110 is a 0–50 microammeter having an internal resistance of 2000 ohms, which is provided with shunts for currents of 0–1000 microamperes and 0–200 microamperes.

In determining the corrosion rate of electrodes 114 and 116 in electrolyte 118, with contact 134 of switch 112 in positions 136 and switch 128 closed, the variable resistors of resistor 130 are adjusted to bring the pointer of meter 132 to a predetermined point on the scale thereof corresponding to 0.02 volt across the meter. Since meter 132 has an internal resistance of 2000 ohms, resistor 130 is adjusted until meter 132 reads to 10 microamperes, by the application of Ohm's law. Meter 132 is used as a voltmeter in this operation. The contacts 134 of switch 112 are then moved to a position between positions 136 and 138 to disconnect electrodes 114 and 116 from circuit 110 so that the entire current, including the portion thereof that went through the electrolyte, goes through ammeter 132. The new reading on ammeter 132 is noted. The current which flowed through the electrodes is then the new reading on ammeter 132 minus the reading of 10 microamperes. The contacts of switch 112 are then moved to positions 138 and the above-described procedure is repeated. The current reading thus obtained is averaged with the previous reading, and the corrosion rate of electrodes 114 and 116 is determined as hereinbefore described.

It can therefore be seen that the method of this invention can be carried out using an ammeter as the only meter. It will be apparent that the current measured when the electrodes are disconnected from the system will only be substantially, not exactly, the current which flows between the electrodes during the time the voltage is applied. However, this error is minor due to the high resistance value of resistor 126 as compared to the apparent resistance of the electrodes. More specifically, resistor 130 will have a resistance of about 10 to 30 times the resistance of the system being investigated. It will be obvious that the exact current flowing between the electrodes can be calculated from the current reading on meter 132 by Ohm's law, if desired, provided the exact value of resistor 130 and E.M.F. source 122 are known.

As hereinbefore pointed out, two dissimilar electrodes can be used to obtain an average corrosion rate. When two electrodes having an appreciable E.M.F. (i.e., above about 0.02 volt) are used, battery 122 is not directly connected to terminals 124 and 126, but indirectly through reversing switch 140. Examples of pairs of dissimilar electrodes are a steel electrode and a stainless steel electrode, and two electrodes of the same metal, one of which is pre-corroded. Reversing switch 140 is a double-pole, double-throw switch constructed so the polarity of the potential applied across terminals 124 and 126 can be reversed by moving contacts 142 from positions 144 to positions 146, or vice versa.

The above-outlined procedure is then necesarily modified. In the modified procedure, switch 128 is closed, contacts 134 of switch 112 are placed in positions 136, and contacts 142 of switch 140 are placed in positions 144. The variable resistors of resistor 130 are then adjusted to bring the pointer of meter 132 to the 0.02 volt position (10 microamperes in this example). If it is impossible to bring the pointer of meter 132 to the 0.02 volt position, contacts 134 of switch 112 are moved to positions 138 and the variable resistors of resistor 130 are adjusted so that meter 132 reads 10 microamperes. Contacts 134 are then moved to the "center off" position and the reading on meter 132 is noted. Then, contacts 142 of switch 140 are moved to positions 146, contacts 134 of switch 112 are moved to the positions opposite that which they were in when the pointer of meter 132 was brought to the 0.02 volt position, and resistor 130 is adjusted until meter 132 reads 10 microamperes. Contacts 142 of switch 140 are moved back to positions 144, contacts 134 are placed in the "center off" position, and the current reading on meter 132 is again noted.

It will be obvious that the last current reading must be corrected to compensate for the fact that the polarity is reversed when the two current readings are made. Specifically, if the 0–50 microampere scale is used, 20 microamperes must be added to the last current reading. Similarily, if the 0–100 microamperes shunt was used, 40 microamperes are added to the last current reading, and 80 microamperes are added when the 0–200 microampere shunt is used. Finally, $\Delta I$ is determined by subtracting the corrected current reading from the first current reading and dividing this difference by two.

FIGURE 10 schematically illustrates an alternative embodiment of the circuit of FIGURE 9 which can be used for determining the corrosion rate of the electrode fabricated of the less active metal in the electromotive series when electrodes of two dissimilar metals are used. Assuming for purposes of a specific example that the corrosion rate of steel is to be determined using steel and zinc electrodes, numeral 114 represents an electrode fabricated of the metal to be studied, viz., steel, which is connected to one of terminals 136 of reversing switch 112. Electrode 116 is fabricated of a metal which is more active in the electromotive series than the electrode to be studied, e.g., zinc, and having an area which is greater than or equal to the area of electrode 114. Zinc electrode 116 is connected through circuit 150 to the second of terminals 136 or reversing switch 112. Circuit 150 consists of potentiometer 152, switch 154 and D.C. potential source 156. Potentiometer 152 is preferably a 0–50 ohm helical potentiometer, the slide of which is connected directly to electrode 116, while potential source 156 may be a dry cell having an E.M.F. of 1.5 volts.

Circuit 110, which is connected to movable contacts of 134 of reversing switch 112, includes 9 volt D.C. potential source 122, switch 128, resistor 130 consisting of 0.1 megohm variable resistance, a 1 megohm variable resistance and a 15 kilohm resistance, and ammeter 132. Switch 128 is preferably one pole of a double-pole quadruple-throw switch, with switch 158 representing the second pole. Switches 128 and 158 are placed in positions "1" when ammeter 132 is used without a shunt and in positions "2" and "3" when shunts for currents 0–100 microamperes and 0–200 microamperes, respectively, are to be connected across ammeter 132. Circuit 110 is opened by placing switches 128 and 158 in positions "4."

In operation, switches 128 and 158 are moved to positions "4" to open circuit 110, and then switch 154 is closed and potentiometer 152 is adjusted so that circuit 150 applies a direct current between electrodes 114 and 116 to counter the current flow between electrodes 114 and 116, i.e., until meter 132 reads 0 current. Switch 154 is left closed and the procedure outlined with respect to the circuit illustrated in FIGURE 9 is then followed. The currents observed on meter 132 when contacts 134 of switch 112 are in positions 136 and 138, are the ΔI for the less active metal, i.e., steel, and the average ΔI for steel is determined as hereinbefore described. The values for the various components of the circuit depicted in FIGURE 10 are only given by way of specific example, and it will be obvious that components of other values can be used.

Another alternative embodiment of a circuit of this invention is schematically illustrated in FIGURE 11, wherein the numeral 170 represents a circuit designed to apply a potential of less than about 0.03 volt between electrodes 172 and 174. Circuit 170 consists of switch 176, D.C. potential source 178 of 1.5 volts, variable resistor 180 of 10 ohms, resistor 182 of 40 ohms, resistor 184 of 0.4 ohm and ammeter 186 capable of reading fractional amperes such as a 0–100 microammeter. An obvious example of D.C. potential source 178 is a dry cell. Resistor 180 is included in circuit 170 so that the resistance thereof can be adjusted to compensate for the deterioration of dry cell 178. Ammeter 186 serves the purpose of indicating the current flowing through circuit 170 so that the potential applied to electrodes 172 and 174 can be determined by Ohm's law. As the description of this embodiment proceeds, it will be obvious that circuit 170 represents only one example of a circuit which can be used to apply the desired potential between electrodes 172 and 174.

Circuit 170 is connected to electrodes 172 and 174 through leads 188 and 190, which are connected to circuit 170 at the junction of resistors 182 and 184 and at the end of resistor 184 remote from resistor 182, respectively. Leads 188 and 190 pass through time-operated relay 192, which is set to automatically reverse the polarity of the potential applied between electrodes 172 and 174 by circuit 170 at suitable intervals of time, such as about 1 to 30 minutes. Alternatively, relay 192 may be a manually operated reversing switch.

Lead wire 188 includes variable resistor 194 between relay 192 and electrode 172. Resistor 194, which is preferably a 1–100 ohm helical potentiometer, is a sensitivity adjustment which is adjusted to any known value between 1 and 100 ohms to achieve a measurable deflection on recorder 196. Connected across resistor 194 is recorder 196 which is selected to read the IR drop across resistor 194, such as a 10 millivolt recorder. Preferably included with recorder 196 is circuit 198, which is a bias adjustment permitting recorder 196 to operate as a center-zero recorder. Circuit 198 includes switch 200, D.C. potential source 202 of 1.5 volts such as a dry cell, 150 kilohm resistor 204 and one kilohm potentiometer 206. Since one skilled in the art will recognize that the potential $E_1$ applied to recorder 196 is represented by $$E_r = \frac{\Delta V R_{194} \Delta I}{\Delta V + R_{194} \Delta I}$$

and ΔV is held substantially constant, at about 0.02 volt for example, recorder 196 can be calibrated in terms of ΔI. Therefore, recorder 196 will indirectly measure the current flow between electrodes 172 and 174. Recorder 196 can then be calibrated to read directly in terms of corrosion rate, since corrosion rate is a function of ΔI.

Various modifications of the circuit illustrated in FIGURE 11 will be obvious to those skilled in the art. As hereinbefore pointed out, circuit 170 represents only one example of a circuit which can be used to apply a voltage of not more than about 0.03 to electrodes 172 and 174. Recorder 196 and circuit 198 may be replaced with a vacuum tube voltmeter where it is not necessary or desirable to utilize a recorder. On the other hand, circuit 198 can be omitted, or the components thereof will be changed depending upon the specific recorder utilized. Relay 192 is preferably located where indicated on FIGURE 11 since in this position it effects a desirable recorder pattern, where the center respresents zero current. The relay 192 may, however, be relocated intermediate resistor 194 and electrodes 172 and 174. It will be apparent that the voltage applied to electrodes 172 and 174 will be reduced during prolonged operation of the apparatus due to the deterioration of battery 178. Minor manual adjustment of resistor 180 keeps meter 186 at the desired value of current. For fully automatic operation, the reduction in the applied potential can be avoided by incorporating a potentiostat in the circuit to maintain the output of circuit 170 constant.

In the operation of the embodiment of this invention illustrated in FIGURE 11, switches 176 and 200 are closed and resistance is adjusted so that circuit 170 applies a voltage of less than about 0.03 volt, preferably 0.02 volt, across leads 188 and 190. Resistor 194 is adjusted so that the IR drop across resistor 194 is on the scale of the recorder, and resistor 206 is adjusted so that the zero position of recorder is substantially in the center of the scale thereof. The system is then in automatic operation with relay 192 causing the polarity of the potential applied between electrodes 172 and 174 to be reversed at predetermined intervals, such as every 2 minutes, and recorder 196 recording the IR drop across resistor 194, possibly directly in terms of ΔI or corrosion.

An example of the record produced by recorder 196 is illustrated in FIGURE 12, where the initial system under study was two mild steel bars, each having a diameter of 0.5 cm. and exposed area of 5 cm.$^2$, disposed in a 3% aqueous sodium chloride solution. After one hour and 12 minutes, designated as time A on FIGURE 12, 1% sodium nitrite, based on the weight of the sodium chloride solution, was added to the solution to demonstrate the inhibiting effect of the nitrite. The points on the graph where the record rises indicate the current flow between the electrodes having a value corresponding to the distance the points are from the center of the graph. The average currents are determined merely by averaging the distance two sequentially recorded, horizontally displaced rises are from the center point of the graph. The displacement of the average current, designated by line 210, from center zero represents the "long cell" corrosion rate caused by dissimilarity between the electrodes. The non-uniformity of the corrosion of the steel bars is indicated by the lack of symmetry around the center zero of the recording. The non-uniformity was deliberately introduced by using a clean electrode and a rusted electrode. The distance between line 210 and the edge of the curve (designated by U and U') represents the "local cell" corrosion rate, i.e., the average corrosion rate of the electrodes in the environment independent of the effect of the dissimilarity between the electrodes. Since line 210 is the mid-point between the edges of the curve U=U'. The "local cell" corrosion rate is obtained by measuring the distance U (or U') and comparing it with ΔI (top scale) or mils per year (lower scale) on FIGURE 12.

Figure 13:
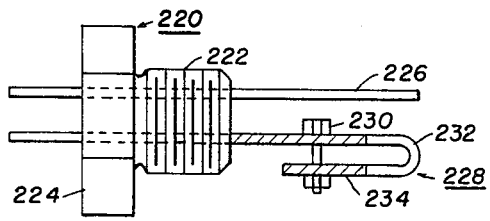

It is difficult to determine the rate of corrosion of equipment under study when that equipment is subject to mechanical stress, unless the test specimens used in the corrosion study are subjected to a stress of similar magnitude during the period in which they are exposed to the corrosive environment. This is due to the fact that the rate of corrosion of a stressed structure may differ from the rate of corrosion of the same structure when it is not subjected to stress. The rate of corrosion of metals subjected to stress is simetimes substantially greater than the rate of corrosion of the unstressed metal, with the rate of corrosion generally varying in proportion to the magnitude of the applied stress. A side view of an electrode assembly which can be used in accordance with this invention for measuring the corrosion rate of materials subjected to mechanical strain is illustrated in FIGURE 13. Referring to FIGURE 13, base 220 is preferably provided with threads 222 for inserting the electrode assembly into a threaded opening in a process vessel and octagon head 224 to accommodate a wrench which may be used to tighten the assembly in place. Supported by base 220 are electrodes 226 and 228, which pass through base 220 in electrically insulated relationship therewith. Electrode 226, which is left bare and unprotected from the corrosive environment, is supported so that it is not under stress. A portion of electrode 228, which is substantially a normally-straight piece of metal, is stressed to a predetermined level by being bent into a U-shaped configuration and held in that position, as by machine screw 230. U-shaped portion 232 of electrode 228 is unprotected and the remaining portion thereof is ensheathed with corrosion-resistant protective coating 234, such as polytetrafluoroethylene, which insulates it from contact with the corrosive environment. The end of electrodes 226 and 228 extending beyond octagon head 224 can then be electrically connected to the circuit schematically illustrated in FIGURES 2, 3 and 9–11.

Electrode 228 can be subjected to any desired stress within its elastic limit, and the magnitude of the applied stress can be calculated by means known to those skilled in the art.

It will be obvious that various modifications of this electrode assembly can be made by one skilled in the art. For example, both of the electrodes of the assembly can be under applied stress. By using two stressed electrodes, the corrosion rate obtained will be closer to that of a structure under stress rather than the average value between stress and unstressed materials. The electrodes can be dissimilar with respect to their shapes, cross-sectional areas and materials from which they are constructed. It is only important that the areas of the electrodes exposed to the corrosive environment be known. Other embodiments of electrodes under stress will be obvious. If desired, the resistant-change-corrosion probes described in U.S. Patent 3,060,728 can be used.

Figure 14:
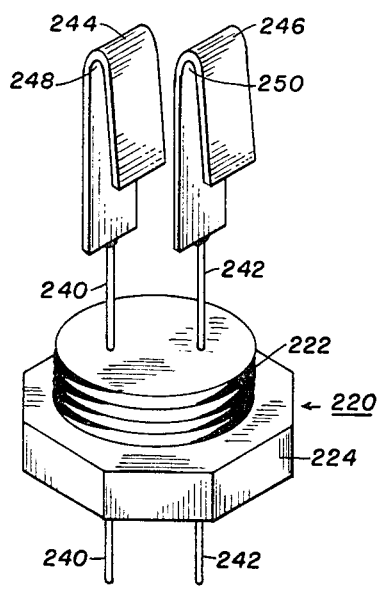

In studying the corrosivity of various environments toward materials of construction, it is frequently desirable to determine the tendency toward corrosion in crevices and cracks, as compared with the more normal surface corrosion. Such corrosion may be called crevice corrosion. Illustrated in FIGURE 14 is an isometric view of an electrode assembly which is especially useful for determining crevice corrosion rates. Base 220, provided with threads 222 and octagon head 224, is made to accommodate lead wires 240 and 242, which pass through base 220 in an electrically insulated relationship therewith. Electrically connected to lead wires 240 and 242, as by solder joints, are electrodes 244 and 246, respectively. The portions of lead wires 240 and 242 which are exposed to the corrosive environment and the soldered joints are preferably coated with a corrosion-resistant, protective coating. Electrodes 244 and 246 are ribbon-like electrodes which are bent sharply to form crevices at points 248 and 250, respectively. Electrodes 244 and 246 may be similar or dissimilar (fabricated of different metals or having different surface conditions). The outer surfaces of electrodes 244 and 246 may or may not be coated with a corrosion-resistant, protective coating, such as polytetrafluoroethylene. If desired, only one of electrodes 244 and 246 may be bent to form a crevice but the corrosion rate obtained will be an average between normal surface corrosion and crevice corrosion. The angles between the bent portions of electrodes 244 and 246 are preferably made as small as possible without causing appreciable contact between the adjacent surfaces. Angles ranging between 2° and 10° have been found to be satisfactory. If desired, electrodes 244 and 246 can each be rebent to form a series of accordion-like pleats. If both of electrodes 244 and 246 are bent, it is preferred that they have the same number of pleats.

Figure 15:
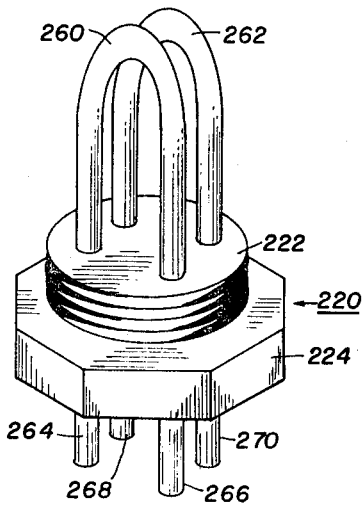

It is often desirable to study the rate of corrosion of a material under controlled temperature conditions since the rate of corrosion of a given material exposed to a corrosive environment will vary as the temperature of the material changes. An example of an electrode assembly which can be used in accordance with this invention for studying the rate of corrosion under controlled temperature conditions is isometrically illustrated in FIGURE 15. Referring to FIGURE 15, the reference numeral 220 designates the base, including threads 222 and octagon head 224, supporting tubular electrodes 260 and 262 for exposure to the corrosive environment. Electrodes 260 and 262 may be cylindrical tubes or tubes of any other cross-section, such as rectangular, hexagonal, octagonal, etc. Electrodes 260 and 262 may be similar (fabricated of the same metal and having the same surface condition) or dissimilar. Electrodes 260 and 262 may be dissimilar with respect to their surface condition (i.e., fabricated of the same metal, but one uncorroded and the other precorroded), and/or the metals of which they are fabricated. Extending beyond octagon head 224 are ends 264 and 266 of electrode 260 and ends 268 and 270 of electrodes 262. The respective ends of electrodes 260 and 262 are connected to means for circulating fluid under controlled temperature conditions therethrough. One end of each of electrodes 260 and 262 is also electrically connected to the measuring circuit such as illustrated in FIGURES 2, 3 and 9–11.

Figure 16:
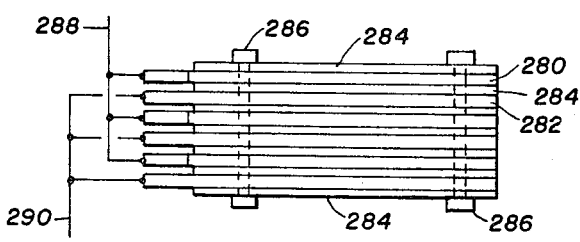

Side and top views of an electrode assembly which is especially useful in corrosive environments of relatively low conductivity are illustrated in FIGURES 16 and 17, respectively. Referring to FIGURES 16 and 17, the first electrode is comprised of a first plurality of metallic ribbon-like strips 280 and the second electrode is comprised of a second plurality of metallic ribbon-like strips 282 which are disposed between metallic strips 280. Strips 280 and 282 are electrically insulated from each other by strips 284 of an electrically non-conductive material, such as a polystyrene resin or polytetrafluoroethylene. The outer flat sides of the two end metallic strips are also covered by strips 284. The widths of metallic strips 280 and 282 and insulating strips 284 are substantially the same and the unit is assembled such that only the edges of metallic strips 280 and 282 are exposed to the corrosive environment. The electrode assembly is held in place by means of plastic rivets 286, or metal machine screws in plastic bushings, which extend through openings in metallic strips 280 and 282 and insulating strips 284. The electrode assembly is connected to a suitable measuring circuit, such as illustrated in FIGURES 2, 3 and 9–11, by electrical conductors 288 and 290 which are electrically connected to metallic strips 280 and 282, respectively.

In order to facilitate the connection of electrical conductors 288 and 290 to the metallic strips comprising the electrodes, it is preferred that insulating strips 284 do not extend to the extreme ends of metallic strips 280 and 282. In a still more preferred embodiment, at least a portion of the ends of strips 280 and 282 which are not in contact with insulating strips 284 are triangularly shaped such that on each of the strips one side of the triangle is along a side edge of the strip. The strips are arranged such that the triangular ends of the strips comprising one electrode extend in one direction while the triangular ends of the strips comprising the second electrode extend in the opposite direction, as shown in FIGURE 17.

In exposing the electrode assembly depicted in FIGURES 16 and 17 to the corrosive environment, it is essential that the assembly not be exposed beyond the portion where insulating strips 284 terminate so that only the edges of metallic strips 280 and 282 are exposed to the corrosive environment. As hereinbefore pointed out, this electrode assembly is especially useful for use in fluids of relatively low conductivity, such as distilled water.

The edges of metallic strips 280 which are exposed to the corrosive environment should be of the same metal and under the same surface conditions. Similarly, the edges of metallic strips 284 exposed to the corrosive environment should be similar, but the exposed edges of strips 282 and 284 need not be similar to each other. The size of metallic strips 280 and 284 and the number of strips utilized in the electrode assembly is not critical. However, metallic strips 280 and 282 will in general be about 0.001 to 0.1 inch thick, 0.25 to 1 inch wide, and 1 to 6 inches long, but other dimensions may be used. In general, the electrode assembly will contain sufficient metallic strips to provide an edge area of the desired range, 1 to 10 cm.$^2$. Insulating strips 284 will be about 0.0005 to 0.005 inch thick, but other thicknesses may be used. Other modifications of this electrode assembly will be obvious to those skilled in the art. For example, the use of separate insulating strips may be avoided by coating the metallic strips with a suitable non-conductive material, assembling the coated metallic strips, and then grinding the edges of the assembled stack of strips to expose the metallic edges.

Referring to FIGURE 18, wherein still another electrode assembly that can be used in accordance with this invention is illustrated, the reference numeral 300 relates to a vessel designed to hold the electrodes of the metal under study. Vessel 300 is divided into two compartments, 302 and 304, by means of fluid impermeable partition 306. Each of compartments 302 and 304 are provided with fluid inlet openings 308 and vent openings 310 through walls of vessel 300. Extending outwardly from wall 306 near the top thereof are support members 312. Rotatably supported within each of compartments 302 and 304 by the bottom wall of vessel 300 and support members 312 are rods 314, which extend beyond the tops of support members 312. The extended ends of rods 314 are provided with gear teeth 316. Engaging gear teeth 316 is gear 318 rotatably mounted by pin 320 in wall 306 and having knurled knob 322 so that it can be easily rotated. Secured to the lower ends of rods 314 are sliding plates 324 which engage the bottom wall of vessel 300 in fluid-tight relationship. Sliding plates 324 are provided with openings 326 which register with openings 308 when sliding plates are properly positioned. Supported within compartments 302 and 304 by covers 328 are electrodes 330 and 332, which are fabricated of the metal to be studied. Electrodes 330 and 332 are connected by lead wires 334 and 336, respectively, to a measuring circuit such as illustrated in FIGURES 2, 3 and 9.

In operation of the assembly depicted in FIGURE 18, the degree with which holes 308 are positioned with holes 326 in sliding plates 324 is determined by the resistivity of the electrolyte being studied. For a resistive electrolyte the degree that openings 308 and 326 are made to register is relatively great, whereas it is relatively small for conductive electrolytes. The degree of positioning holes 326 with respect to holes 308 is determined by a precalibration procedure using an electrode which is similar (i.e., same surface area, fabricated of the same metal, and having the same surface) to electrodes 330 and 332 and a reference electrode, such as a saturated calomel electrode. Using the reference electrode and the electrode which is similar to electrodes 330 and 332 in the standard manner without vessel 300, the current that flows when a known voltage of less than about 0.03 volt, preferably about 0.02 volt, is applied between the electrodes is determined. Then, vessel 300 is placed in the corrosive environment so that the exposed areas of electrodes 330 and 332 (areas exposed to the corrosive environment in compartments 302 and 304) are the same as the exposed area of the electrode used in the precalibration procedure in combination with the reference electrode. A voltage greater than about 0.03 volt, e.g., 0.05 to 0.1 volt, is applied between the electrodes and knob 322 is rotated to vary the degree with which openings 326 register with openings 308 to give the same current determined during the precalibration procedure. The scale of the microammeter in the associated measuring circuit (e.g., ammeter 36 of FIGURE 2) can be calibrated to read units of corrosion rate directly, as in this system the correction for resistivity is made through the adjustable openings rather than through correction of the current. A given corrosion rate will therefore result in a given current. For example, the corrosion rate using steel electrodes having an exposed area of 5 square centimeters in neutral solutions having a pH greater than 5 will equal 0.3 mil per year per microampere reading.

Various modifications of the apparatus of FIGURE 18 will be obvious. For example, the device may include only one adjustable opening. If the single adjustable opening is located in wall 306, compartments 302 and 304 will then serve as the test vessel. On the other hand, if opening 308 in one of compartments 302 or 304 is relatively large and non-adjustable, the adjustable opening in the other compartment can be used alone to control the IR drop. In addition, the above-described precalibration procedure can be varied, as by using three electrodes, i.e., the test electrode fabricated of the metal under study, the reference electrode and a third electrode which is preferably inert in the electrolyte, such as a carbon or platinum electrode. In this modified procedure, a D.C. potential source, a variable resistor and an ammeter are connected between the test electrode and the third electrode, the function of which is to complete the circuit. The resistor is then adjusted to pass sufficient current to effect less than about 0.03 voltage change in the electrode potential of the test electrode as measured with the reference electrode (by means of a voltmeter connected between the test electrode and the reference electrode). Following this precalibration procedure, two electrodes of the metal under study are used as hereinbefore described.

Instead of using at least two electrodes to make the corrosion measurements, only one electrode may be used by installing it as a reference in the vessel or pipe containing the corrosive environment. Referring to FIGURE 19, which schematically illustrates one embodiment of a circuit for using only one electrode, circuit 340 consists of switch 342, ammeter 344, D.C. potential source 346, variable resistor 348, and voltmeter 350, which is preferably a pull type potentiometer having an infinite resistance at null or a vacuum tube voltmeter. Connected across-voltmeter 350 are electrical conductor 352 and circuit 354. Circuit 354 consists of D.C. potential source 356 and potentiometer 358, the slide of which is connected directly to conductor 360. As a specific example of this embodiment, ammeter 344 is an ammeter capable of accurately reading very small currents, such as a 0 to 50 microampere ammeter, potential sources 346 and 356 are 1.5 volt dry cells, resistor 348 is a one megohm variable resistor and potentiometer 358 is a 50 ohm resistor.

Electrical conductors 352 and 360 are connected to pipe 362 containing the corrosive environment and through lead 374 to electrode 364 which is to be used as the reference in making the corrosion measurements. In order to be able to use the calibration chart of FIGURE 8, the area of electrode 364 exposed to the corrosive environment must be 2.5 cm.$^2$ and pipe 362 and electrode 364 must be fabricated of steel or a metal more active than steel, e.g., zinc. However, it will be obvious that electrodes having exposed areas other than 2.5 cm.$^2$ and fabricated metals other than steel can be used. Pipe 362 can be fabricated of any metal, galvanized steel for example so long as it is not coated internally, i.e., so that the metal is exposed to the corrosive environment.

The procedure of using the embodiment of FIGURE 19 consists of opening switch 342 and adjusting resistor 358 until voltmeter 350 reads zero. If it is impossible to bring the pointer of meter 350 to the zero volt position, the polarity of potential source 356 is reversed and resistor 358 is adjusted so that meter 350 will read zero volts. It will usually not be necessary to reverse the polarity of potential source 356 if pipe 362 and electrode 364 are fabricated of the same metal. Then, switch 342 is closed and resistor 348 is adjusted until voltmeter 350 reads the desired $\Delta E$, as for example, 0.02 volt. The reading on ammeter 344 is then noted and the current reading thus obtained is used to determine the corrosion rate of pipe 362 in the manner hereinbefore described. It is apparent that the corrosion rate of pipe 362 can be obtained by this embodiment without any averaging process.

As illustrated, electrode 364 can be one specimen of a conventional electrical-resistance corrosion probe, such as described in U.S. Patents 2,869,003; 2,956,225 and 2,987,685. In this embodiment, corrosion probe 366 consists of bare electrode 364 and reference specimen 368 encased in a protective coating, such as an epoxy resin, which are preferably fabricated of the same metal. Electrode 364 and specimen 368 are mounted on electrically nonconductive base member 370 which insulates electrode 364 and specimen from each other and pipe 362. Electrically connected to specimens 364 and 368 is lead 372, which extends through base 370. Also traversing base 370 are electrical leads 374 and 376 which are respectively connected to the other ends of specimens 364 and 368. Electrical leads 372, 374 and 376 are connected to electrical metering network 378, such as described in U.S. Patents 2,824,293 and 2,830,265. Conductor 360 is connected to electrode or specimen 364 by means of lead 374. Probe 366 can then be used to calibrate the rate meter for metals other than steel, as hereinbefore described. After the calibration has been completed, a simple one electrode unit may be used.

Various modifications of this embodiment will be apparent to one skilled in the art. For example, the values given for the various components of cricuits 340 and 354 are only given by way of illustration and components of other values may be used. Electrical conductors 352 and 360 may be electrically connected to the circuit depicted in FIGURE 10 instead of the circuit illustrated.

It is apparent that the corrosive system tested in accordance with this invention must have some conductivity, and preferably a high conductivity. Hence, the method is not applicable to corrosion tests of hydrocarbon systems such as gasolines, fuel oils, etc. However, satisfactory results have been obtained in tests on a 50/50 hydrocarbon-water emulsion. Satisfactory results have been obtained using a wide variety of aqueous systems of diverse pH, and with and without the addition of corrosion inhibitors to the system. In general, it has been found that recalibration of the apparatus is required when the pH of the system changes from a value greater than about 3.5 to a value less than 3.5.

Measurements have been made upon aqueous systems at temperatures ranging from ambient up to about the boiling point of water, with good results. Corrosivity measurement on wet soil has been made, again showing good correlation with resistance change corrosion probe techniques.

Steel corrodes in soils by a mechanism involving oxygen dissolved in the interstitial water. To illustrate the application of the corrosion rate meter of this invention to the study of soil corrosion, an experiment was carried out in which twin probe electrodes were placed in 60-mesh silica sand. The sand was saturated with aerated 1% NaCl solution. So long as the sand pores were liquid-full the corrosion rate measured by both the method of this invention and the resistance-change technique was quite small (Table III). A low corrosion rate is to be expected because in soils static conditions minimize the availability of oxygen at the surface of the electrodes.

After the low corrosion rate had been established, the sand was drained. From previous work it is known that drained soil or sand is quite corrosive; a thin film of water remains through which oxygen may diffuse readily to the surface of the steel. Steel in the drained sand showed a high corrosion rate by both the method of this invention (instantaneous) and the resistance-change technique.

TABLE III.—CORROSION RATES OF STEEL IN 60-MESH SILICA SAND AQUEOUS PHASE 1% NaCl

|  | Instantaneous (m.p.y.) | Resistance-change (m.p.y.) |
|---|---|---|
| Sand Liquid-Full | 1.1 | 1.9 |
| Drained | 10.1 | 12.0 |

The conclusion from this experiment is that the rate meter is useful in determining corrosive soil conditions. As in the case of aqueous corrodents, the resistivity should be known or estimated and its value should be under 10,000 ohm-cm. for best results. A special electrode assembly could be driven to the depth of soil of interest to provide daily or seasonal corrosion rates in a long-range study.

Serious corrosion problems exist in many secondary recovery water-injection systems in oil fields. The water used in such systems is often contaminated with dissolved oxygen, $H_2S$, and species of bacteria which are said to promote corrosion.

To illustrate the possible application of the rate meter to the study of corrosion in such systems, comparative tests were made in a secondary recovery installation in southern Illinois. Dual probe electrodes were used in the surge tank of the system. The average corrosion rate by the electrical resistance probe method was 7 m.p.y., and by this invention 5 m.p.y. While the electrical resistance method yielded the corrosion rate in a run lasting overnight, this invention yielded a comparable rate within a few minutes after the electrodes had been installed.

A high pressure electrode unit was installed in an injection line. The observed corrosion rate was consistently about 3 m.p.y. except for a brief period when it increased to 15 m.p.y. After about 30 minutes the rate returned to the lower level and remained there. The reason for this behavior is unknown. The ability to detect brief changes in corrosion rate could be of value in plant applications when it is desired to adjust the operating procedure so that the least corrosion occurs.

Electrical resistance probes were made using 70–30 brass shim stock. Two such probes were used as electrodes for the instantaneous corrosion rate meter of this invention. The probes were immersed in aerated 0.01% NaCl solution, and the metal loss was followed over a period of 18 hours. There was essentially no corrosion during this period, during which the instantaneous corrosion rate meter gave readings between 0 and 1 m.p.y. at $K=5.0$. (While the rate meter was not calibrated for use with brass, it appeared from the data that K would be about 5.0 under the condition of the experiments.)

Copper probes were used in experiments similar to those carried out with brass. In aerated 0.01% NaCl the corrosion rate by both the electrical resistance corrosion meter (probe method) and the instantaneous corrosion rate meter was essentialy zero. In 2 N $NH_4OH$ the corrosion rate by the probe method was 17 m.p.y. and by the rate meter was 19.5 m.p.y. at $K=5.0$. No attempt was made to calibrate the rate meter, but it could have been calibrated if desired.

Because of the difficulty of soldering aluminum, probes of this metal are not convenient to build; so weighed coupons were used as rate meter electrodes. The alloy was 6061-T6, which has a negligible corrosion rate in aerated dilute NaCl solution. The corrosion rate by the rate meter of this invention in such a solution was zero under both static and agitated conditions. The weight loss after 18 hours was practically zero.

In 1% $Na_2CO_3$ solution, air-saturated, the rate meter yielded a $\Delta I$ of 285 μa., while the actual corrosion rate by weight loss was 170 m.p.y. This indicates a K value of 6.0 for aluminum under these conditions.

As with brass and copper, the rate meter is operable with this aluminum alloy. To obtain quantitative data it would be necessary to run enough test to establish the constant K with accuracy.

The embodiments of the invention in which an exclusive property or privilege is claimed are defined as follows:

1. A corrosion rate measuring apparatus comprising a vessel for containing a corrosive environment, a pair of electrodes disposed within said vessel, a D.C. potential source, adapted to apply less than about 0.03 volt across the electrodes, a resistor and a potentiometer having two fixed terminals series connected to said resistor and potential source in closed circuit, a voltmeter and a variable resistor series connected between a movable terminal of said potentiometer and a terminal of said fixed resistor remote from said potentiometer, and means for connecting said electrodes in parallel with said voltmeter, one of said electrodes being a specimen of the metal whose corrosion rate is to be tested.

2. A corrosion rate measuring apparatus comprising a vessel for containing a corrosive environment, a pair of electrodes disposed within said vessel, a D.C. potential source, a variable resistor and an ammeter series connected in closed circuit and conductor means for connecting said electrodes in parallel with said ammeter, said conductor means including switch means for reversing the polarity applied by said closed circuit to said electrodes, one of said electrodes being a specimen of the metal whose corrosion rate is to be tested.

3. An apparatus in accordance with claim 2 in which said electrodes are fabricated on different metals and said D.C. potential source includes a polarity reversing switch.

4. A corrosion rate measuring apparatus comprising a vessel for containing a corrosive environment, first and second electrodes disposed with said vessel, a circuit adapted to apply a measured potential of less than about 0.03 volt across said electrodes, first and second electrical conductor means for respectively connecting said first and second electrodes to said circuit, one of said electrical conductor means including a resistor, and means for measuring the IR drop across said resistor, said circuit including a D.C. potential source, an ammeter and at least one variable resistor series connected in closed circuit, one of said electrodes being a specimen of the metal whose corrosion rate is to be tested.

5. An electrode assembly for measuring corrosion rates comprising a stacked plurality of metallic ribbon-like strips, adjacent strips being separated from one another by a non-corrodible, electrically non-conductive material and the outer flat sides of the two end metallic strips being covered by a non-corrodible material such that only the edges of said metallic strips in at least an end part of said assembly are exposed, means for holding said stacked plurality together, a first electrical conductor connected to every other metallic strip, and a second electrical conductor connected to the remaining metallic strips, one of said strips being a specimen of the metal whose corrosion rate is to be tested.

6. An electrode assembly in accordance with claim 5 in which all of said metallic strips are fabricated of identical metals.

7. An electrode assembly in accordance with claim 5 in which the metallic strips connected to said first electrical conductor are fabricated of a first metal and the metallic strips connected to said second electrical conductor are fabricated of a second metal.

8. An apparatus for measuring corrosion rates comprising two containers having fluid-impermeable side and bottom walls and being adapted to contain a corrosive environment, a wall of each of said containers having an opening therethrough for placing the interiors of said containers in fluid communication with each other through said openings, means for adjusting the degree of fluid communication between the interiors of said containers through said openings, and two electrodes fabricated of identical metals, one of said electrodes being disposed in each of the containers, one of said electrodes being a specimen of the metal whose corrosion rate is to be tested.

9. An apparatus in accordance with claim 8 in which one vessel is divided into said two containers by fluid-impermeable means, said fluid-impermeable means being a side wall of each of the containers.

10. An apparatus in accordance with claim 9 in which each of said containers has an opening through the bottom wall thereof and includes adjusting means for adjusting the size of said openings.

11. The method of determining the rate of corrosion of a metal in a corrosive conductive environment comprising
   (a) disposing known areas of at least three electrodes fabricated of the same metal at substantially differing distances from each other in a corrosive environment having a resistivity exceeding about 100 ohm-cm.,
   (b) for each electrode pair applying between the pair of electrodes a first D.C. potential having a known value of less than about 0.03 volt, determining substantially the current flow between the pair of electrodes at the time said first potential is applied, applying between the pair of electrodes a second D.C. potential having a known value of less than about 0.03 volt and a polarity opposite that of said first potential, and determining substantially the current flow between the pair of electrodes at the time said second potential is applied,
   (c) determining the corresponding zero spacing current, and
   (d) determining the corrosion rate from the magnitudes of said potentials and the zero spacing current, at least one of said electrodes being a specimen of the metal whose corrosion rate is to be tested.

12. The method of measuring corrosion comprising disposing two spaced electrodes in a corrosive conductive environment, using a circuit of high resistance to apply between said electrodes a first D.C. potential having a known value of less than about 0.03 volt, said circuit having a resistance of about 10–30 times the resistance of said electrodes in said corrosive environment, discontinuing the application of said first potential, determining substantially the current flow which took place between said electrodes at the time said first potential was applied, and using the magnitudes of said first potential and current to determine the corrosion measurement, one of said electrodes being a specimen of the metal whose corrosion rate is to be tested.

13. The method in accordance with claim 12 in which the step of determining substantially the current flow which took place between said electrodes at the time said first potential was applied is followed by the steps of applying between said electrodes a second D.C. potential having a known value of less than about 0.03 volt and a polarity opposite that of said first potential, discontinuing the application of said second potential, and determining substantially the current flow which took place between said electrodes at the time said second potential was applied, and the corrosion measurement is determined using the magnitudes of said potentials and currents.

14. The method in accordance with claim 13 in which said electrodes are fabricated of identical metals.

15. The method in accordance with claim 13 in which said electrodes are fabricated of different metals of different activities in the electromotive series, and the area of the electrode fabricated of the more active metal in the electromotive series is at least equal to the area of the other electrode.

16. The method in accordance with claim 15 in which the application of said first D.C. potential is preceded by the step of applying between said electrodes a third D.C. potential to counter the current flow between said electrodes, the application of said third D.C. potential being continued during the application of said first and second potentials, and the corrosion rate of the less active metal is determined using the magnitudes of said first and second potentials and currents determined.

17. The method of measuring corrosion comprising disposing two spaced electrodes in a corrosive environment, applying between said electrodes a first D.C. potential having a known value of less than about 0.03 volt through two electrical conductors connected to said electrodes, one of said electrical conductors containing a resistor, measuring the IR drop across said resistor at the time said first potential is applied and using the magnitudes of said first potential and IR drop to determine the corrosion measurement, one of said electrodes being a specimen of the metal whose corrosion rate is to be tested.

18. The method in accordance with claim 17 in which the step of measuring the IR drop across said resistor at the time said first potential is applied is followed by the steps of applying between said electrodes a second D.C. potential having a known value of less than about 0.03 volt and a polarity opposite that of said first potential, and measuring the IR drop across said resistor at the time said second potential is applied, and the corrosion measurement is determined using the magnitudes of said potentials and measured IR drops.

19. The method of measuring corrosion comprising exposing two spaced, corrodible, electrically conductive speciments to a corrosive conductive environment within a vessel, applying between said specimens a first D.C. potential to counter any current flow between said specimens, and while continuing the application of said first potential applying between said specimens a second D.C. potential having a known value of less than about 0.03 volt and determining substantially the current flow between said specimens at the time said second potential is applied, and using the magnitudes of said second potential and current to determine the corrosion measurement.

20. The method in accordance with claim 19 in which the step of determining the current flow between said specimens at the time said second potential is applied is followed by the steps of applying between said specimens a third D.C. potential having a known value of less than about 0.03 volt and a polarity opposite that of said second potential and determining substantially the current flow between said specimens at the time said third potential is applied, and the corrosion measurement is determined using the magnitudes of said second and third potentials and currents.

21. The method in accordance with claim 20 in which the interior surface of said vessel is used as one of the specimens.

22. The method of measuring corrosion comprising disposing a corroded electrode and an uncorroded electrode in spaced relationship in a corrosive conductive environment, said electrodes being fabricated on the same metal, applying between the electrodes a D.C. potential having a known value of less than about 0.03 volt, determining substantially the current flow between the electrodes at the time said potential is applied, and using the magnitudes of said potential and current to determine the corrosion measurement, one of said electrodes being a specimen of the metal whose corrosion rate is to be tested.

23. The method of measuring corrosion of a metal in a corrosive conductive environment comprising applying a first D.C. potential having a known value of less than about 0.03 volt between a first pair of electrodes disposed in spaced relationship in said corrosive environment, one of said first pair of electrodes being fabricated of said metal and the other being a reference electrode, determining substantially the current flow which takes place at the time said first potential is applied, placing a second pair of electrodes in electrolytic communication with each other in said corrosive environment, said electrodes of said second pair being similar to the electrode of said first pair fabricated of said metal, applying between said second pair of electrodes a second D.C. potential having a known value greater than about 0.03 volt, varying the degree of electrolytic communication between said second pair of electrodes to produce a current flow between said second pair of electrodes which is substantially the same as the current flow which took place at the time said first potential was applied, and using the magnitudes of said second potential and second-named current to determine the corrosion rate, one of said electrodes in an electrode pair being a specimen of the metal whose corrosion rate is to be tested.

References Cited

UNITED STATES PATENTS

| 2,414,411 | 1/1947 | Marks | 204—195 |
| 2,568,713 | 9/1951 | Brenner | 204—195 |
| 2,585,059 | 2/1952 | Wallace | 204—228 |
| 2,585,060 | 2/1952 | Wallace | 204—195 |
| 2,856,495 | 10/1958 | Chittum et al. | 324—71 |
| 2,928,775 | 3/1960 | Leisey | 204—195 |
| 2,947,679 | 8/1960 | Schaschl et al. | 204—195 |
| 3,065,151 | 11/1962 | Schaschl et al. | 204—195 |
| 3,069,332 | 12/1962 | Seyl | 204—1.1 |
| 3,098,801 | 7/1963 | Marsh et al. | 204—1.1 |
| 3,207,678 | 9/1965 | Marsh et al. | 204—1.1 |
| 3,250,689 | 5/1966 | Seyl | 204—1.1 |

OTHER REFERENCES

Evans: "Metallic Corrosion Passivity and Protection," 1948, pp. 18–21.

HOWARD S. WILLIAMS, *Primary Examiner.*

T. H. TUNG, *Assistant Examiner.*

UNITED STATES PATENT OFFICE
CERTIFICATE OF CORRECTION

Patent No. 3,398,065                                  August 20, 1968

Glenn A. Marsh

It is certified that error appears in the above identified patent and that said Letters Patent are hereby corrected as shown below:

Column 21, line 44 "with" should read -- within --.

Signed and sealed this 10th day of February 1970.

(SEAL)
Attest:

Edward M. Fletcher, Jr.                         WILLIAM E. SCHUYLER, JR.
Attesting Officer                                       Commissioner of Patents